United States Patent
Young et al.

(10) Patent No.: US 7,163,191 B2
(45) Date of Patent: Jan. 16, 2007

(54) HIGH PRESSURE GATE VALVE

(75) Inventors: Lee Edward Young, Salina, KS (US); Shawn Michael Werner, Salina, KS (US)

(73) Assignee: Salina Vortex Corporation, Salina, KS (US)

( * ) Notice: Subject to any disclaimer, the term of this patent is extended or adjusted under 35 U.S.C. 154(b) by 0 days.

(21) Appl. No.: 11/096,447

(22) Filed: Apr. 1, 2005

(65) Prior Publication Data

US 2006/0219969 A1 Oct. 5, 2006

(51) Int. Cl.
F16K 25/00 (2006.01)
(52) U.S. Cl. ...................... 251/203; 251/329
(58) Field of Classification Search ................ 251/203, 251/193, 326–329
See application file for complete search history.

(56) References Cited

U.S. PATENT DOCUMENTS

| | | | | |
|---|---|---|---|---|
| 571,880 A | * | 11/1896 | Lunken | 251/203 |
| 3,351,180 A | * | 11/1967 | Herzog et al. | 251/203 |
| 3,557,822 A | * | 1/1971 | Chronister | 251/203 |
| 4,294,427 A | * | 10/1981 | Cilny | 251/203 |
| 4,534,540 A | * | 8/1985 | Bragin et al. | 251/203 |

OTHER PUBLICATIONS

Brochure, "DeZurik® KBD Bi-Directional Knife Gate Valves", SPX Valves & Controls, Bulletin 37.00-2, May 2001 (4 pgs).
Brochure, "L&M Valve", Tyco Valves & Controls, Bulletin No. LMVMC-0108-US-0110, 2001 (4 pgs).
Brochure, "Rovalve", Tyco Valves & Controls, Bulletin No. ROVMC-0084-US-0405, 2004 (4 pgs).
Brochure, "Series G Knife Gate Valves", Red Valve Co., Inc. (2 pgs). This Brochure is believed to have been in publication at least 1 year prior to Apr. 1, 2005.
Brochure, "Fabri-Valve® C/F37 Heavy Duty Knife Gate Valve", Engineered Valves Group (1 pg). This Brochure is believed to have been in publication at least 1 year prior to Apr. 1, 2005.

* cited by examiner

*Primary Examiner*—John Bastianelli
(74) *Attorney, Agent, or Firm*—J. David Wharton; Stinson Morrison Hecker LLP

(57) ABSTRACT

A high-pressure gate valve for control of bulk materials includes a main body with an opening for passing bulk material, an upper body, a slideable blade, and lifting structure configured to raise the blade in a planar motion, perpendicular to the primary direction of travel and seal it against the upper body when the blade is extended. An actuating cylinder coupled with a rear edge of the blade extends and retracts the blade. A rear portion of the valve is enclosed to protect the rear edge of the blade, the actuating cylinder, and the coupling between the two.

14 Claims, 5 Drawing Sheets

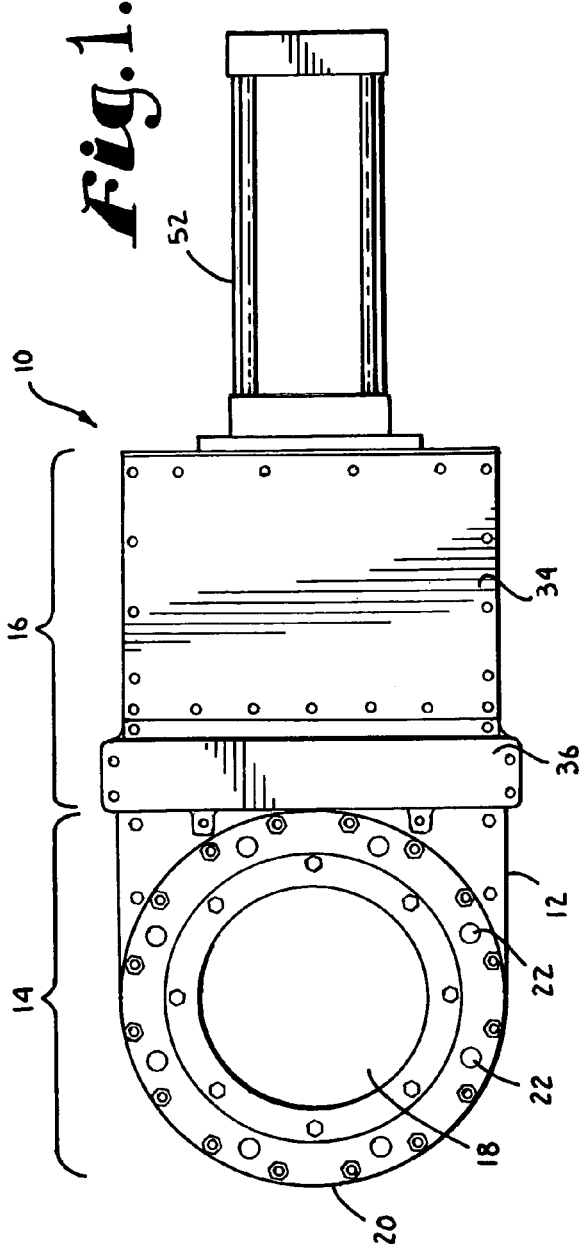
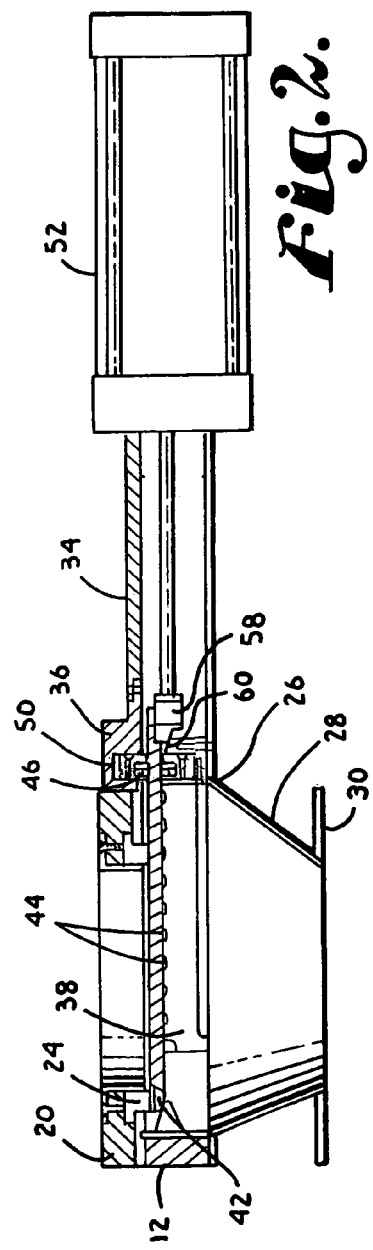

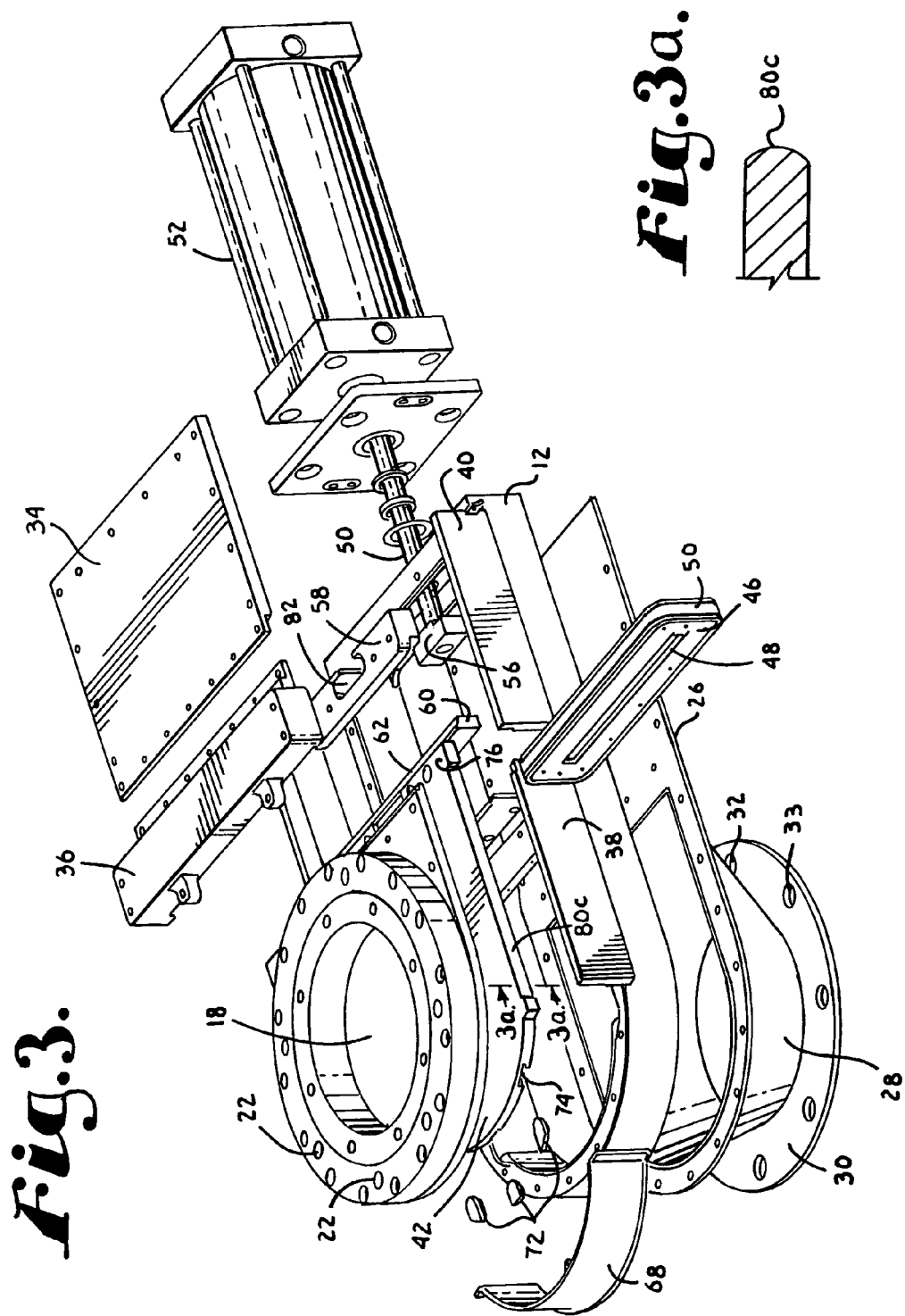

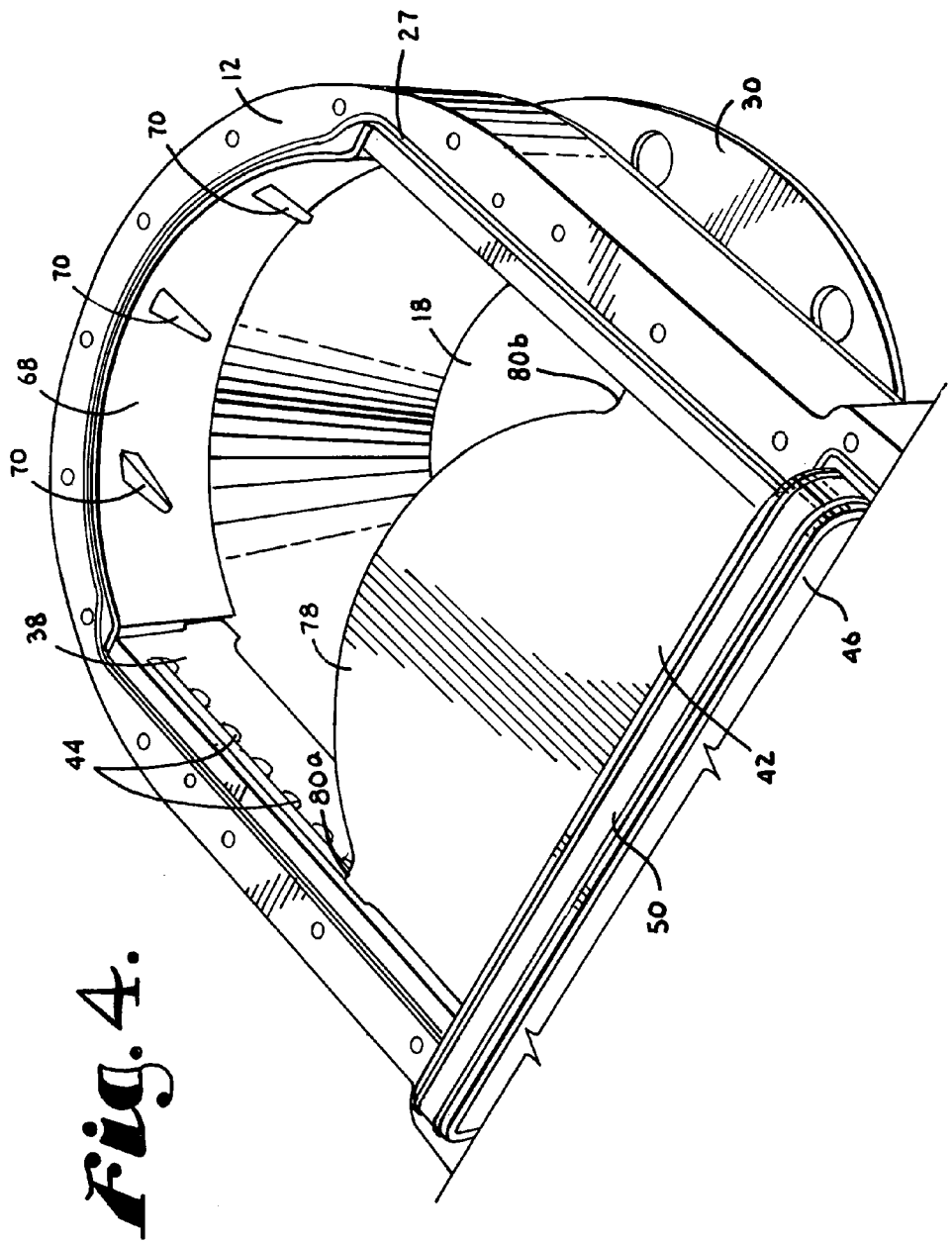

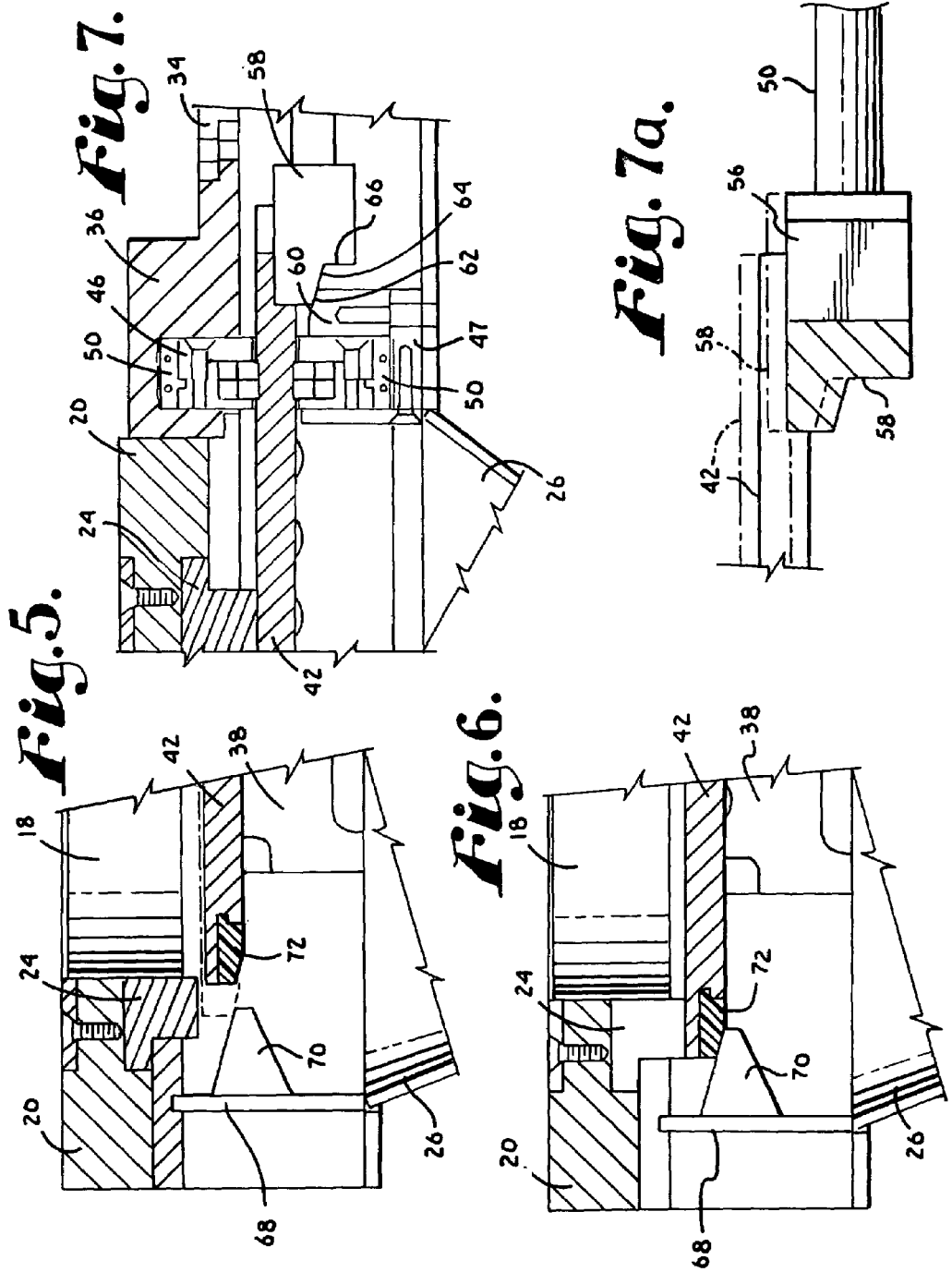

HIGH PRESSURE GATE VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to valves, and more particularly to gate valves used in the control of flow of materials. The invention is particularly applicable to gate valves which are utilized in handling bulk solids in installations where the pressure exceeds atmospheric.

2. Description of Related Art

Various valves are used in manufacturing and production facilities to control the flow of materials within the facility, or within systems in the facility. Slide-gate or knife-gate valves are commonly used to control a variety of material types, including bulk solids, liquids, gases, and slurries. These gate valves commonly have a structural frame with an opening for passing material with a sliding blade to block and unblock the opening. The blade is typically driven by a linear actuator using pneumatic or hydraulic power to extend and retract the actuator and blade.

Various blade nose configurations are used depending on the type of material being used and the sealing properties desired. For example, in liquid, gas and slurry applications, the nose of the blade typically seats against a resilient seal, such as an o-ring. In dry material applications, the nose edge of the blade is typically thrust upward against an elastomeric seal as an actuating cylinder pushes the blade horizontally. This combination of horizontal and vertical thrust motion can, however cause uneven seal wear as the leading edge of the blade has a higher seal seat contact pressure than the rear of the blade. It also stresses the cylinder shaft and places uneven loads on the cylinder seals. The perpendicular thrusting motion (relative to the direction of movement) places a torsional force on the actuator shaft causing premature wear of the actuator seals and potentially damaging the actuating cylinder. Any time a valve is operated in a pressurized environment the issues surrounding proper sealing are greatly enhanced.

Gate valves according to the prior art have most often been designed to be used with liquids and gases. These materials displace themselves when subject to the action of the gate and accordingly proper sealing of the valve is relatively easy to accomplish. "Bull nose" knife or gate valves have long been successfully used to control the flow of liquids and gases. Using gate valves with dry material presents problems with material "packing" into the valve seat area and getting trapped, preventing the valve from fully closing and seating. Particularly vulnerable is the void area formed between the valve housing and the radius of the typical rounded "bull nose" end of the blade. Material is easily trapped and wedged into the void formed between the blade and the housing. This trapped material may preclude proper sealing of the valve by preventing it from fully closing and will increase power consumption by the actuator as it works to overcome the obstruction. The "packed" material being handled may also be damaged by the wedging action. Trapped material also contributes to cross-contamination when different materials are routed thru the same valve.

At the rear edge of the blade, a sealed bonnet may be used to separate the actuating cylinder from the material path. This bonnet protects the working mechanism and also precludes materials passing through the valve from escaping into the environment. A bonnet seal assembly may be utilized to seal the bonnet area from the material flow opening. This bonnet seal is also subject to uneven wear and premature failure. The uneven perpendicular thrusting motion of the blade, referred to above, causes uneven compression on the bonnet seal, which in-turn leads to wear and premature seal failure. Since the bonnet seal provides the only isolation between the valve blade and the atmosphere, failure of the seal allows material to escape into the atmosphere. Material leaking into the bonnet may also interfere with proper valve operation.

Thus, there remains a need in the art for a positively sealing gate valve capable of handling dry bulk solid materials without the problems of seal failure and material packing inherent in the prior art valve designs.

BRIEF SUMMARY OF THE INVENTION

The present invention is directed to a high-pressure gate valve having a housing defining an opening through which dry, liquid, or gaseous material passes, a slideable blade which moves on blade support guides attached to the housing, an actuating cylinder to extend and retract the blade, and lifting structure to raise the blade in a generally planar motion as the blade is extended into its closed position. "High pressure" is used herein to refer to any valve operating above atmospheric pressure but especially installations where the pressure is in the range of 50–90 p.s.i.g. The perpendicular lifting of the blade (relative to the primary closing movement) positively seals the upper surface of the blade to an annular elastomeric seal in upper portion of the housing.

Upper and lower plates cooperate to form a bonnet which encloses the rear portion of the valve with a continuous resilient bonnet load seal surrounding the blade at one end and isolating the actuating portion of the valve from the material handling portion. As the blade is raised by the lifting structure, the bonnet load seal at the rear portion of the blade compresses against an upper bonnet cover, thus maintaining a seal between the front material handling portion of the valve and the rear actuating portion. The bonnet load seal includes one or more continuous air cavities which when compressed on one side increase the pressure on the other sides. Additionally, the bonnet seal is designed to scrape material from the blade surface as the blade retracts.

In one exemplary embodiment, the valve includes a housing having scalloped blade guides along opposing inner sides. A blade having a semi-circular shaped nose with flat portions on opposite sides of the semi-circle, slides on the guides to block and unblock an opening through the housing as the blade is extended and retracted. An actuating cylinder coupled to a clevis at the rear edge of the blade extends and retracts to operate the blade.

Lifting structure, comprising multiple lifting lugs at the front of the housing and a ramp extending across the center portion of the housing, raises the entire blade in a generally planar motion as the blade extends to positively seal the upper surface of the blade against the elastomeric seal mentioned above. The lifting lugs engage replaceable nylon wear surfaces on the bottom of the blade to raise the front portion of the blade, while a tapered surface on the clevis at the rear of the blade engages the ramp to raise the rear edge of the blade. Thus, as the blade is extended the front edge engages the lifting lugs and the clevis at the rear edge engages the ramp to raise the blade in a planar motion. The blade will continue to seal as a result of the "ramping action" even as the elastomeric seal wears.

A unique blade shape includes a rounded end which mergers into flat sections on either side which move over the blade guides. This configuration eliminates the void area between the blade and the housing where material can accumulate and become wedged upon blade closure.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 1 is a top plan view of an exemplary embodiment of a gate valve in accordance with the present invention.

FIG. 2 is a cross-sectional side view of the gate valve of FIG. 1.

FIG. 3 is an exploded, perspective view of the gate valve of FIG. 1.

FIG. 3a is a vertical cross sectional view taken along line 3a—3a of FIG. 3.

FIG. 4 is a partial, perspective view of the front portion of the valve of FIG. 1 with the upper housing removed.

FIG. 5 is an enlarged, partial view of the front portion of the valve of FIG. 2 with the blade in a nearly extended position.

FIG. 6 is an enlarged, partial view of the front portion of the valve of FIG. 2 with the blade in its fully extended, closed position.

FIG. 7 is an enlarged, partial cross-sectional view of the rear lifting ramp, floating clevis and bonnet load seal which encases one end of the blade.

FIG. 7a is an enlarged vertical cross-sectional view illustrating the substantially vertical movement of the blade relative to the actuating cylinder coupler.

DETAILED DESCRIPTION OF EXEMPLARY EMBODIMENTS

Figure 8:
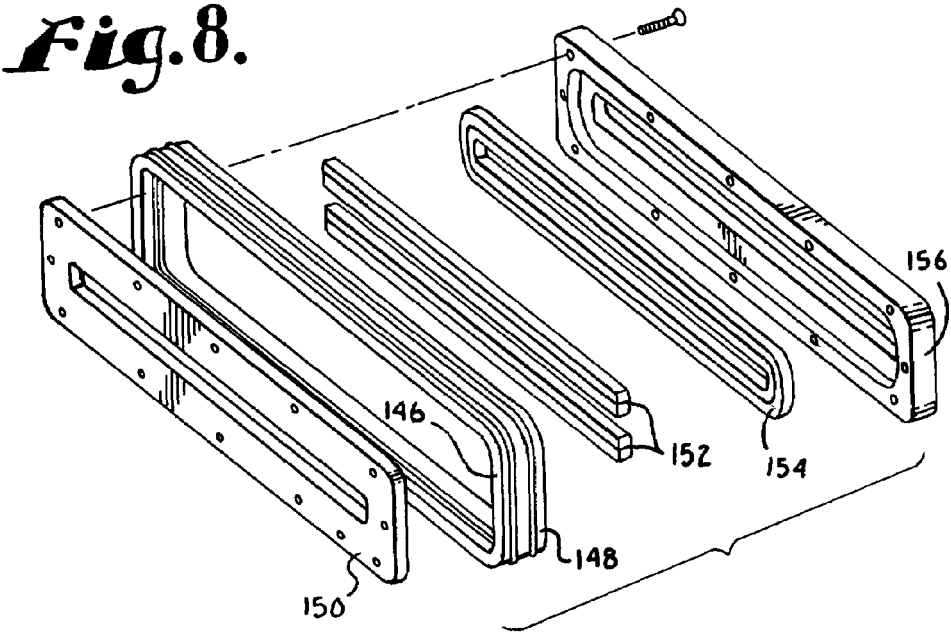
FIG. 8 is an exploded view of the bonnet seal assembly of FIG. 7.

A high pressure gate valve according to an exemplary embodiment of the present invention is depicted in FIGS. 1 through 8. While the invention will be described in detail hereinbelow with reference to this embodiment, it should be understood that the invention is not limited to the specific constructions or configurations shown in the exemplary embodiment. Rather, one skilled in the art will appreciate that a variety of configurations may be implemented in accordance with the present invention.

Looking first to FIGS. 1–3, a gate valve in accordance with an exemplary embodiment of the present invention is designated generally by the numeral 10. Gate valve 10 includes a main housing 12 having a front material-handling portion 14 and a rear actuating portion 16. A circular opening 18 through front portion 14 allows material to flow through the valve.

A disc-shaped upper flange 20 attaches to the upper surface of main housing 12 with fasteners. Flange 20 includes apertures 22 for connecting valve 10 to various inlet lines, tubes or couplers. An elastomeric annular seal 24 extends around the lower surface of housing 20 and protrudes into the opening 18 area of main housing 12, presenting a circular sealing surface.

A lower housing 26 extends the length of housing 12, and attaches to the lower surface of this housing with fasteners. An approximate perimeter o-ring seal 27 (FIG. 4) between housing 12 and housing 26 at the interface between the two assures an air tight seal. Lower housing 26 covers rear portion 16 of main housing 12 and provides a funnel-shaped exit passage 28 for opening 18. Thus housing 26 forms the lower half of a bonnet which encloses the rear portion of the valve. A flange 30 extending outwardly from exit passage 28 includes numerous apertures 32 for connecting the lower cover 26 to other components of the system. An upper cover plate 34 and a seal retainer plate 36 attach to the upper surface of housing 12 to form the upper half of the valve bonnet. Main housing 12, flange 20, lower housing 26, upper cover 34, and seal retainer plate 36 are preferably made of strong, rigid material. Most preferably they are made of aluminum or stainless steel.

As best seen in FIGS. 2–4, front and rear blade support guides 38, 40 are attached to opposing inner walls of main housing 12. Front guides 38 attach within front portion 14 of housing 12 and rear guides 40 attach within rear portion 16 of the housing. The guide tracks present an "L"-shaped ledge upon which blade 42 rides. As shown in FIG. 2, front guides 38 form scalloped portions 44 along the length of the ledge. Front and rear guides 38, 40 are preferably made from a rigid polymeric material or high temperature metal alloy.

Figure 9:
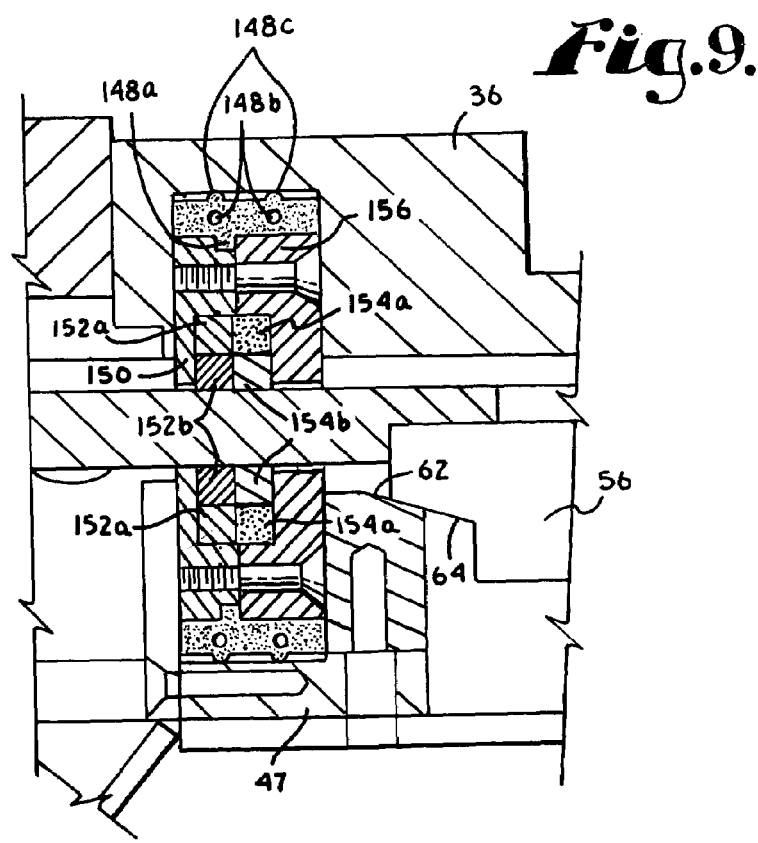
FIG. 9 is a greatly enlarged cross-sectional view of the bonnet seal assembly showing the details of construction.

Referring to FIGS. 3, 8 and 9 a bonnet load seal assembly is designated generally by the numeral 46 and includes an elastomeric perimeter load seal 148, forward scraper housing 150, scraper seals 152, elastomeric packing gland 154 and housing support 156. Details of construction of load seal 148 are shown in FIG. 8. Load seal 148 is made of an elastomeric material and includes a tung portion 148a which is received in a correspondingly shaped groove formed in the assembly by scraper 150 and housing 156. Two air passages 148b are formed in the load seal body and extend the length of the seal. Overlying these passages are raised portions 148c. Bonnet seal assembly 46 extends across main housing 12, separating front portion 14 from rear portion 16. Assembly 46 presents a slot 48 through which blade 42 passes. The compressible load seal 148 extends around the outer perimeter of scraper 150 and housing 156, engaging seal retainer plate 36 on the top and a frame cross member support 47 at the bottom. Seal 148 also engages the sides of housing 12 at the opposite ends of the assembly. Preferably seal 148 is made of a resilient material, most preferably it is made of silicone rubber.

An actuating cylinder 52 is attached to the rear edge of main housing 12 and includes a shaft 54 which extends into rear housing portion 16 and is enclosed within the bonnet. Various o-rings and seals provide a leak-proof junction where shaft 54 passes through the rear of main housing 12. A cylinder clevis coupler 56 is attached to the end of shaft 54 and is received by a floating clevis yoke 58, which is in-turn attached to the rear edge of blade 42. A ramp 60 extends between and is attached to the frame cross member 47 of main housing 12 just to the rear of bonnet seal assembly 46, presenting an inclined upper surface 62. As best seen in FIG. 7, the leading edge of clevis yoke 58 includes a tapered lower surface 64 corresponding to the taper of the upper surface 62 of ramp 60.

Referring now to FIGS. 3 and 4, a forward support liner 68 having protruding lifting lugs 70 is attached along the inner surface of the front-most portion of housing 12. Lifting lugs 70 protrude from liner 68 into opening 18 and present angled surfaces for engagement with the lower surface of blade 42. A number of replaceable lug lifting guides 72 are attached within cutouts 74 in the lower surface of blade 42 at positions corresponding to the locations of lifting lugs 70. Blade 42 is preferably made of a strong, rigid material. Most preferably it is made of stainless steel. Guides 72 are preferably made from a strong polymeric material. Most preferably they are nylon.

Still referring to FIGS. 3 and 4, blade 42 includes a rear edge 76 to which clevis yoke 58 is joined and a semi-circular shaped front nose portion 78. Two flat portions 80a, 80b join front nose portion 78 to the side edges 80c of the blade. Flat portions 80a, 80b effectively position nose portion 78 back from the sides of blade 42. Flat portions 80a and 80b extend perpendicular to a tangent to the arcuate nose portion 72 at the two terminal ends of the arc and are also perpendicular to guides 38 and 40. Preferably the side edges 80c of blade 42 are convex to maximize seal integrity while the blade passes through bonnet seal assembly 46. See FIG. 3a.

With the valve fully assembled, blade 42 extends from rear portion 16 of housing 12 to front portion 14 of housing 12, passing through seal assembly 46. Clevis yoke 58, attached to the rear edge of blade 42, is coupled via clevis coupler 56 to shaft 54 of actuating cylinder 52, which is attached to the rear of housing 12. Each side edge of blade 42 rests on the ledge portion of the corresponding front and rear blade guides 38, 40, which are attached on opposing sides of main housing 12.

Seal assembly 46, cover plate 34, seal retainer 36, and lower housing 26 form the bonnet which encloses rear portion 16 of housing 12, protecting actuator shaft 54, coupler 56, and yoke 58. With the covers in place, seal 148 engages retainer 36, support member 47, and opposite sides of main housing 12. Any air leakage or minute material ingress across seal assembly 46 is retained within the bonnet allowing equalization of pressure between rear portion 16 and front portion 14 of housing 12.

In normal operation, with power applied to actuating cylinder 52 and shaft 54 retracted, blade 42 is fully retracted and opening 18 is unblocked to allow material to pass through the valve. As actuator 52 is extended, blade 42 moves to begin blocking opening 18. As best seen in FIG. 5, as the actuator extends and the nose of blade 42 approaches the front edge of main housing 12, blade 42 passes under annular seal 24, eventually blocking opening 18.

Referring to FIGS. 6 and 7, as the cylinder is extended further, guides 72 on the lower surface of blade 42 engage lifting lugs 70 at the front of main housing 12. The angle of the lifting lugs raises the front edge of blade 42 to force the upper surface of blade 42 against annular seal 24. Simultaneously, at the rear of blade 42 tapered lower surface 64 of clevis yoke 58 engages the tapered upper surface 62 of ramp 60. The angle of the engaged tapered surfaces raises the rear portion of blade 42 against annular seal 24. With reference to FIG. 3, clevis yoke 58 presents an oblong slot 82 which receives clevis coupler 56 such the yoke 58 is free to move vertically relative to coupler 56 while the two components remain coupled. This simultaneous lifting of both ends of blade 42 in a substantially planar motion and perpendicular to the direction of travel of shaft 54 positively seals the upper surface of blade 42 against annular seal 24. See FIG. 7a where the raised positions of blade 42 and clevis 58 are shown in broken lines.

This perpendicular planar movement of blade 42 allowing it to float relative to shaft 54 also eliminates torisional loads that uneven, nonplanar vertical movement would place on the shaft using a conventional fixed clevis coupling. The force of the blade against seal 24 will limit the cylinder stroke once a material tight seal is obtained. Seal wear is reduced by the perpendicular planar motion of the blade and the absence of substantial sliding movement between seal 24 and the blade 42. It is also to be noted that the inclined ramp surfaces presented by lifting lugs 70 and ramp 60 are of a length such that when the shaft 54 of cylinder 52 is extended a gap G1 (FIG. 2) is present between the front edge of the blade and the housing 12 and a similar gap, G2 is present between the leading edge of ramp 60 and the leading edge of clevis yoke 58. These gaps accommodate further vertical and horizontal movement of blade 42 as seal 24 wears over time. Another advantage of the aforedescribed construction is that as a result of the perpendicular planar motion of blade 42 the power requirements for cylinder 52 are reduced over conventional knife gate valves which rely to some extent upon an uneven wedging action to accomplish the desired seal. When cylinder 52 is to be retracted, blade 42 can slide down the inclined ramp surfaces away from the elastomeric seal with virtually no sliding contact between the two components.

Referring to FIGS. 8 and 9, scraper 152 removes material from blade 42 when the latter is retracted by cylinder 52. Scraper 152 comprises upper and lower sections each of which has an outer layer 152a of elastomeric material and an inner blade contacting layer 152b of hard polymer material (see FIG. 9). The elastomeric layer is live loaded when assembled so as to apply a compressive force on layer 152b. Packing gland 154 comprises a continuous oval shaped element formed from an outer layer 154a of elastomeric material and an inner blade contacting layer 154b of cord formed from a material such as Teflon. The elastomeric material is live loaded to place the Teflon cord under compression. Material removed by scraper 152 is precluded from entering the bonnet area. Scraper seals 152 are held in place by housing 150, packing gland 154 and housing support 156. The bonnet area is further sealed against the entry of material by load seal 148. As blade 42 is extended into its flow blocking position and moves in a perpendicular direction as previously explained, the upper surface of the blade will apply pressure to bonnet seal assembly 46 causing compression of load seal 148. The compressive force on the elastomeric material is further enhanced by raised portions 148c engaging retainer plate 36. This compressive force causes air in passages 148b to be forced from the passage in the area where pressure is applied and the air is redistributed throughout the unobstructed length of the air passages. This increase in air pressure in the unobstructed portions of the passageways applies pressure to the elastomeric material and facilitates maintaining a material tight seal at the bottom and sides of the seal assembly 46, notwithstanding the slight perpendicular movement of the entire assembly. When blade 42 moves to its retracted position seal assembly 46 returns to its neutral position and the air within the passageways of load seal 148 will equalize to provide equal compression on all sealing surfaces.

Looking still to FIG. 3, slot 48 through seal assembly 46 allows blade 42 to extend and retract to block opening 18.

Slot 48 may not form an airtight seal with blade 42, thus any air leakage will cause equalization of pressure between front portion 14 and rear portion 16 of main housing 12. Once pressure is equalized, material is prevented from migrating via the air stream between front material handling portion 14 and rear bonnet portion 16 of the gate valve. Sealed bonnet area 16 prevents air and material leakage to environment.

In operation of the valve bulk material lying on the surfaces of guides 38 is pushed out of the way by the flats 80*a* and 80*b*. The cutout areas of scalloped portions 44 allow material pushed off the upper surfaces of the guides to fall down and through the valve without wedging or jamming. Thus, as the blade is extended, material will be cleared from in front of the blade and will not be packed as the blade reaches the end of its path of travel where any material cleared from the guides is discharged into the material stream.

From the foregoing it will be seen that this invention is one well adapted to attain all ends and objectives hereinabove set forth, together with the other advantages which are obvious and which are inherent to the invention.

Of course, other embodiments configuration will be apparent to those skilled in the art, and are contemplated by and within the scope of the present invention.

Since many possible embodiments may be made of the invention without departing from the scope thereof, it is to be understood that all matters herein set forth or shown in the accompanying drawings are to be interpreted as illustrative, and not in a limiting sense.

The terms "substantially", "generally", "approximately", and "relatively" as used herein may be applied to modify any quantitative representation which could permissibly vary without resulting in a change in the basic function to which it is related. For example, while the extending blade is described as "substantially" blocking the valve opening, variance from fully blocked is allowable if the variance does not materially alter the capability of the invention. Likewise, the variance from any quantitative representation, such as proximate or adjacent as used herein, is permissible if the variance does not materially alter the capability of the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A gate valve for controlling the flow of material, said valve comprising:
    a housing defining an opening through which said material passes;
    a slideable blade moveable relative to said housing between an open position and a closed position to control material flow through said opening;
    at least one lifting lug coupled with said housing and presenting an inclined surface for engagement with said blade; a clevis coupled with said blade, said clevis operably coupled to said actuator; a ramp rigid with said housing and positioned below said blade and presenting a second inclined surface so that upon movement of said actuator said clevis engages said ramp and said blade engages said lifting lug to raise said blade in a generally planar motion perpendicular to the direction of travel of said actuator; and
    an actuator coupled with said blade to move said blade between said open and closed positions.

2. The gate valve of claim 1, wherein said lifting structure comprises:
    a plurality of said lifting lugs coupled with said housing.

3. The gate valve of claim 2, wherein said blade comprises a plurality of replaceable lug lifting guides corresponding to and aligned with said lifting lugs, each of said guides presenting a nonmetallic wear surface.

4. The gate valve of claim 1, wherein said ramp presents a tapered upper surface to engage said clevis.

5. The gate valve of claim 1, wherein said housing comprises an elastomeric seal extending around said opening such that said seal engages said blade when said blade is raised into said closed position.

6. The gate valve of claim 5, wherein said actuator movement terminates when said blade seals against said elastomeric seal.

7. The gate valve of claim 6, wherein said inclined surfaces of said lifting lugs and said ramp are of a length to accommodate increasing movement of said actuator resulting in further raising of said blade as said elastomeric seal wears.

8. The gate valve of claim 1, wherein said actuator comprises a cylinder including a shaft and said clevis includes a clevis yoke coupled with said blade and a clevis coupler rigid with cylinder shaft, said clevis coupler being received by said clevis yoke, said coupler and said yoke being movable relative to each other in a direction perpendicular to said shaft.

9. The gate valve of claim 1, wherein said actuator comprises a cylinder and said valve includes a bonnet enclosing at least the shaft of said cylinder, and further having a bonnet seal assembly comprising,
    a seal support through which said blade extends;
    a blade scraper which removes material from said blade as said blade retracts; and
    an elastomeric material received by said seal support and extending around said support on all sides while in contact with said housing,
    said elastomeric material including a continuous closed air passage and a ridge on its outer surface overlying said passage, whereby when said perpendicular force is applied to said component said elastomeric material is compressed and said ridge engages said housing thereby displacing air from said passage in the area of application of said force moving the displaced air to other areas of said passage to thereby increase the pressure against said elastomeric material in said other areas.

10. The gate valve of claim 9, wherein is included a guide for said blade on opposite sides of said housing.

11. The gate valve of claim 10, wherein said blade comprises a semicircular leading edge and first and second flat portions at the ends of said semicircle, said flat portions extending perpendicular to said housing.

12. The gate valve of claim 11, wherein the sides of said blade are convex.

13. The gate valve of claim 11, wherein at least a portion of said guides comprise scalloped surfaces and said flat portions of said blade move over said scalloped surfaces and clear material from same.

14. A gate valve for controlling the flow of material, said valve comprising:

a. a housing defining an opening through which material passes;
b. a slideable blade moveable relative to said housing between an open position and a closed position to control material flow through said opening;
c. at least one lifting lug coupled with said housing and presenting an inclined surface for engagement with said blade;
d. a cylinder having a shaft coupled with said blade to move said blade between open and closed positions;
e. a bonnet enclosing at least the shaft of said cylinder;
f. a bonnet seal support through which said blade extends;
g. a blade scraper which removes material from said blade as said blade retracts; and
h. an elastomeric material received by said seal support and extending around said support on all sides while in contact with said housing, said elastomeric material including a continuous closed air passage and a ridge on its outer surface overlying said passage, whereby when said perpendicular force is applied to said component said elastomeric material is compressed and said ridge engages said housing thereby displacing air from said passage in the area of application of said force moving the displaced air to other areas of said passage to thereby increase the pressure against said elastomeric material in said other areas.

* * * * *